United States Patent [19]

Getchell et al.

[11] 4,211,387
[45] Jul. 8, 1980

[54] VALVE CONSTRUCTION

[75] Inventors: Williams G. Getchell; Norman A. Lambert, both of Warren, R.I.

[73] Assignee: G. W. Dahl Company, Inc., Bristol, R.I.

[21] Appl. No.: 886,625

[22] Filed: Mar. 13, 1978

[51] Int. Cl.² .................... F16K 41/10; F16K 31/365
[52] U.S. Cl. .................. 251/335 B; 251/61.4
[58] Field of Search .............. 251/335 B, 61.4

[56] References Cited

U.S. PATENT DOCUMENTS

| | | | |
|---|---|---|---|
| 2,925,987 | 2/1960 | Priesmeyer | 251/61.4 |
| 3,251,575 | 5/1966 | Campbell et al. | 251/335 B |
| 3,399,695 | 9/1968 | Stehlin | 251/335 B |
| 3,528,087 | 9/1970 | Perkins | 251/335 B |
| 3,675,891 | 7/1972 | Reynolds et al. | 251/335 B |
| 3,884,446 | 5/1975 | Erickson | 251/61.4 |
| 3,904,174 | 9/1975 | Giese | 251/335 A |

FOREIGN PATENT DOCUMENTS 1294498  4/1962  France ................................ 251/335 B

*Primary Examiner*—William R. Cline
*Assistant Examiner*—H. Jay Spiegel
*Attorney, Agent, or Firm*—Salter & Michaelson

[57] ABSTRACT

A valve assembly for controlling the flow of fluids, particularly corrosive fluids, wherein a valve actuator is sealingly shielded within a bellows assembly from contact with such fluid. A top portion of the bellows assembly is fixedly positioned with respect to the valve body and the actuator contacts a lower plug portion of the bellows assembly which serves to open and close a valve passage upon longitudinal movement of the actuator with respect to the valve body. A flexible pleated portion of the bellows assembly permits extension and contraction thereof in unison with the actuator's movement.

9 Claims, 9 Drawing Figures

VALVE CONSTRUCTION

BACKGROUND OF THE INVENTION

This invention relates to valve constructions and particularly to a valve assembly which has utilization in handling corrosive fluids. Valve assemblies of this general nature are known, as for instance, those constructed of highly corrosion resistant materials so that the fluids directly contacting such components will not cause corrosion and potential failure thereof. Utilization of sophisticated metal materials for this purpose may, however, involve complex machining in addition to material cost factors and their use may still necessitate the tailoring of particular materials to particular fluid applications. It accordingly is also known to form all or at least major components of valve assemblies from substantially inert plastic resin materials such as polyethylene, polypropylene and fluoroethylene polymers such as Teflon. Valves constructed of plastic may, however, lack the necessary tolerance and strength characteristics required and, accordingly, a need exists for an improved valve assembly wherein normally utilized non-sophisticated metal components thereof are shielded from contact with corrosive fluids during the operation thereof.

Inasmuch as valves of this type are often utilized in inaccessible locations and are actuated by remote control, it is particularly necessary that any protective element not only effectively shield the metal working components of the valve from corrosion, but also does not interfere with reliable valve operation. An example of the overall type environment in which valves of this nature may be utilized is set forth in U.S. Pat. No. 3,884,446 issued May 20, 1975 and assigned to the G. W. Dahl Company, Inc., Bristol, R.I. Therein disclosed is a control valve actuator which has utility in actuating the present valve assembly and accordingly the disclosure thereof is hereby specifically incorporated by reference into the present application.

SUMMARY OF THE INVENTION

The present invention provides a valve assembly for controlling fluid flow which includes a bellows assembly of unique construction which enables the actuator rod of the valve to be completely and effectively shielded from contact with corrosive fluids yet still permit the longitudinal actuating movement of the rod within a bore provided in the bonnet section of the valve. The upper portion of the valve assembly is fixed in position with respect to the valve as by the clamping engagement of an outwardly extending flange and the lower or valve closure plug portion thereof is operatively connected to the actuator rod so that longitudinal movement thereof with respect to the valve enables the plug to move between open and closed valve positions. An intermediate section of the bellows assembly including a plurality of molded, machined or otherwise formed accordion pleats enables the bellows assembly to longitudinally expand and contract within the bore while at all times shielding the actuator rod from contact with corrosive fluid.

It is accordingly a primary object of the present invention to provide a fluid control valve assembly which utilizes a bellows assembly at least in part formed of a relatively inert and corrosion resistant plastic which in turn shields the valve's actuator rod and other external metal parts from contact with corrosive fluids and which otherwise does not interfere with the trouble-free construction and operation of the valve.

A further object of the present invention is the provision of a uniquely constructed bellows assembly within a control valve so that the actuator rod thereof is shielded therewithin and which bellows assembly will longitudinally expand and contract within a valve bore so as to permit an actuator rod to move a valve plug between open and closed positions of the valve.

A still further object of the present invention is the provision of a protective bellows assembly for use in conjunction with a fluid control valve which incorporates a unique manner of sealing the component portions thereof so as to in turn assure the complete shielding of a valve actuator rod positioned therein from contact with corrosive fluids within the valve.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
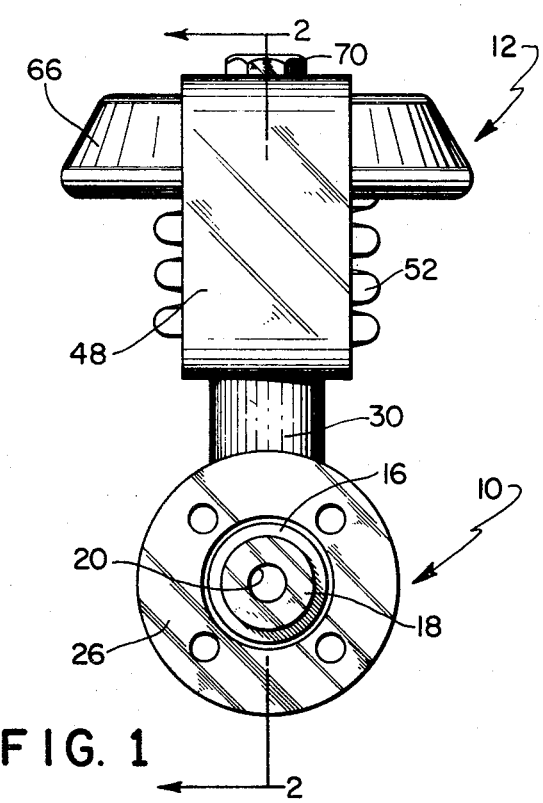
FIG. 1 is an end elevational view of a control valve and actuator therefor in which the valve assembly of the present invention is utilized.
Figure 2:
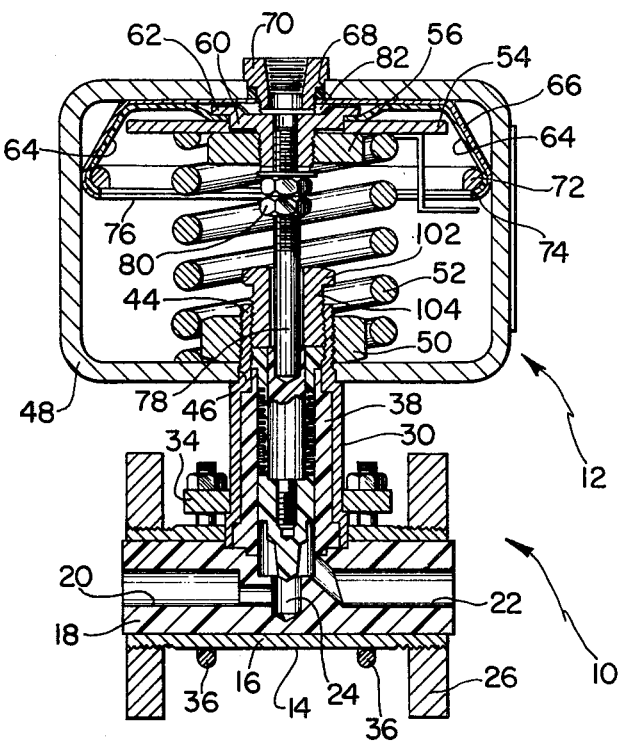
FIG. 2 is a side sectional view of one form of the invention.
Figure 3:
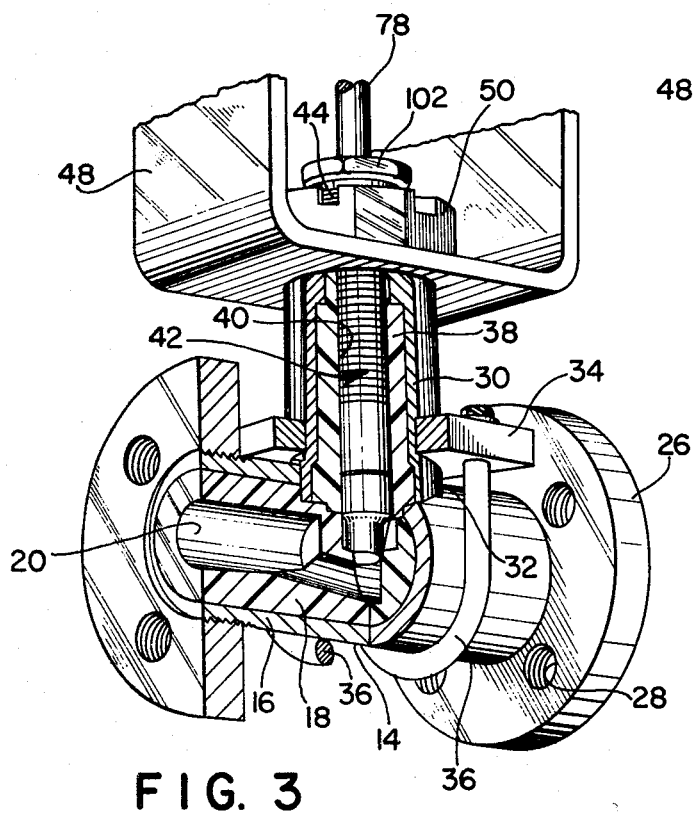
FIG. 3 is a partial perspective view on an enlarged scale with parts broken away and in section illustrating the embodiment of FIG. 2.
Figure 4:
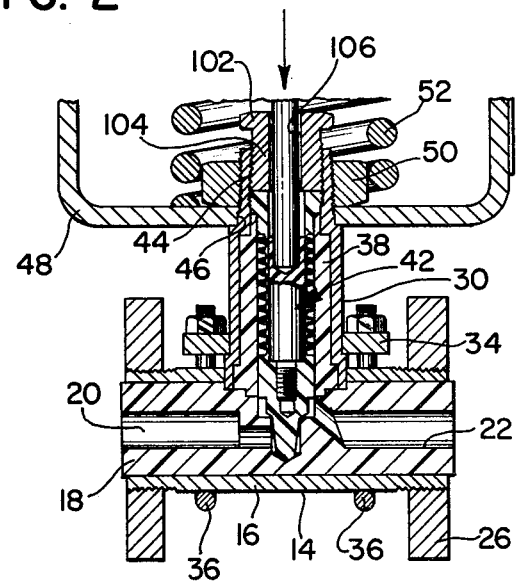
FIG. 4 is a partial side sectional view similar to FIG. 2, but showing the valve assembly of the present invention in a closed valve position.

The valve assembly 10 shown in the drawings may also include an actuator 12 so that the valve may be controlled in open and closed positions thereof from remote location as by the initiation of an actuating medium thereto such as compressed air. The valve assembly 10 includes a valve body 14 including housing 16, a member 18 of any suitable corrosion resistant material which in turn defines an inlet passage 20, an outlet passage 22 and an intermediate valve chamber 24. The housing 16 may be threaded or otherwise provided with attachment means at either end thereof to receive flanges 26 having openings 28 provided therein so as to facilitate the coupling of the valve assembly 10 with other pipes, couplings and the like as is known.

The valve body 14 further includes a bonnet or shank portion 30 outwardly extending and generally normal to the body 16. The bonnet may further by provided with an outwardly extending lower abutment 32 through which the bonnet 30 may be assembled in relationship to the housing 16 by means of a plate 34 secured thereto as by U-bolts 36. The interior of the bonnet 30 may also be provided with a corrosion resistant liner 38 which in turn defines a longitudinally extending bore 40 for receipt of a bellows assembly 42 as hereinafter will be more apparent. The upper end of the bonnet 30 is provided with an inwardly directed threaded shank 44 which is received within an opening 46 in the bottom of a metal frame 48 in turn housing the actuator assembly 12. A large threaded nut 50 engages the shank 44 and the bottom of the case or frame 48 so as to fix the position of the actuator 12 and valve assembly 10 with respect to each other. The nut 50 further serves to laterally position a heavy spring 52 against the bottom wall of the case. The spring at its upper end bears against an actuator plate 54.

The plate 54 is in turn connected to an upper nut 56 which receives an adapter 60 in a central opening 58 thereof. The adapter 60 is provided with an outwardly extending flange 62 which in cooperation with the plate 54 serves to secure in position a portion of a flexible diaphragm 64 formed from any suitable material such as fabric reinforced rubber. In its non-actuated or rest position, the diaphragm 64 engages a metal case 66 of pie plate shape which is in turn affixed to the upper surface of the housing 48 by any suitable means. Also the top of the housing 48 is provided with an opening 68 for receipt of a fitting 70 so as to supply pneumatic of other known actuation mediums to the actuator assembly. The other end of the diaphragm 64 is positioned between a ring 72 and a rolled over edge 74 which in turn defines an opening 76 for receipt of the spring 52 and other mechanisms serving to actuate the valve from closed to open positions.

The collar 60 is in turn adapted to threadably receive the upper end of a metal actuator rod 78 and is fixed in position with respect thereto by adjusting nuts 80. Accordingly, upon pressurization of the diaphragm 64 as by the entrance of compressed air into the chamber 82 defined between the diaphragm 64 and the case 66, the diaphragm and, of course, the plate 54 and those components attached thereto will be forced downwardly so as in turn to actuate the actuator rod 78 longitudinally with respect to the bonnet bore 40. As previously indicated, the bore 40 receives the bellows assembly 42 the construction of which will be more readily evident by simultaneous reference to FIGS. 2 through 6 of the drawings.

The bellows assembly 42 is essentially hollow and includes an enlarged head or upper portion 84 exhibiting an outwardly extending flange 86 and a central opening 87 for receipt of the rod 78, an intermediate portion 88 including a plurality of separate molded, machined or otherwise formed accordion pleats 90 and a lower section 92 forming a plug having a suitable configuration to permit alternate opening and closure of the valve by its respective longitudinal movement within the chamber 24. The configuration of the plug 92 may therefore include a tapered surface 94 for mating engagement with a valve seat 96 in the closed position and preferably includes an upper boss portion 98 of circular configuration dimensioned so as to interfit with the bore 40. In this manner, then, fluid within the chamber 24 or moving between entrance and exit passages 20, 22 thereof, primarily contacts the plug portion 92 of the bellows assembly 42. The bellows assembly is preferably molded, machined or otherwise formed of a corrosion resistant or otherwise inert plastic material such as polyethylene, polypropylene or fluoroethylene polymers such as Teflon.

Figure 5:
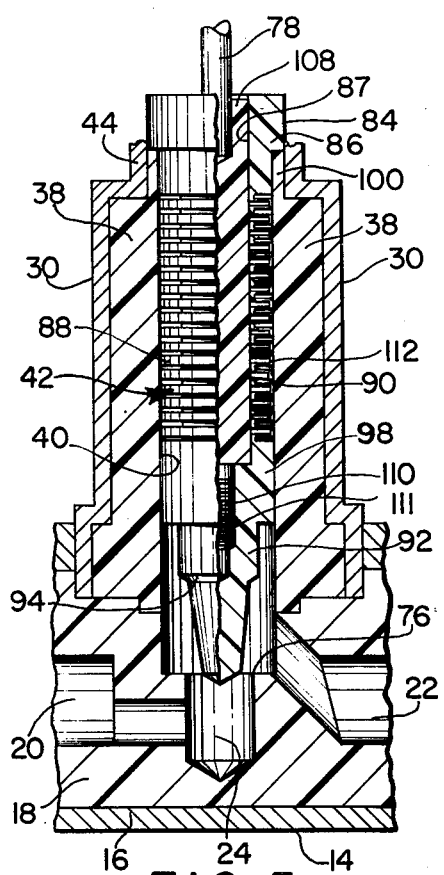
FIG. 5 is an enlarged detailed sectional view of a portion of FIG. 2 showing the bellows assembly thereof in open position.
Figure 6:
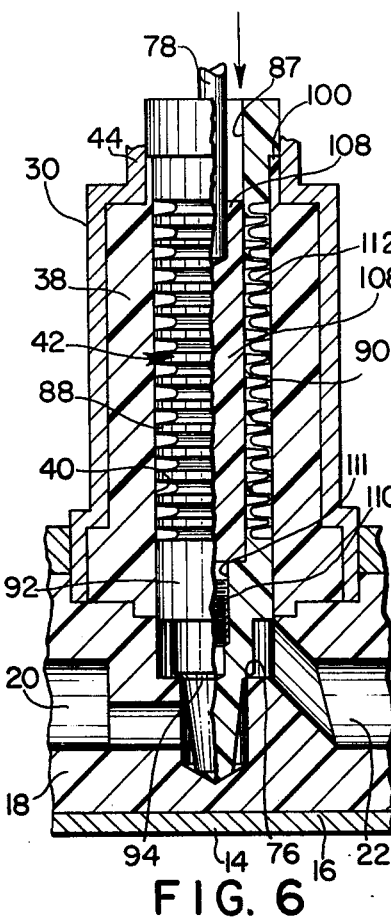
FIG. 6 is a partial sectional view similar to FIG. 5 but showing the bellows assembly in closed position.

It should also be noted that the insert 38 terminates in a ledge or extension 100 on which the flange 86 of the headed portion 84 of the bellows assembly is adapted to rest. In this regard, the shank 44 is interiorly threaded to receive a nut 102 in turn having a downwardly extending boss 104 which is adapted to engage the top of the head or upper portion 84 so as to force such into sealing contact with the ledge 100. The nut 102 also includes a central passage 106 for receipt of the actuator rod 78. The rod 78 is received within the hollow interior of the bellows assembly 42 and in turn is connected either directly or by means of an intermediate member 108 to the plug portion 92. Thus, as best shown in FIG. 5, the rod 78 is connected to the intermediate member insert 108 at the top thereof as by the forced interfit shown therein or any other suitable means, i.e., welding, threaded engagement, etc., and the insert 108 is in turn provided at the lower portion thereof with a threaded post or insert 110 adapted for interconnection with a similarly threaded channel or bore 111 within interior portions of the plug 92. In this manner, then, the rod 78 is connected to the plug 92 and upon longitudinal movement thereof, as upon acutation by the acutator assembly 12, causes the plug 92 to longitudinally move within the chamber 24 so as to alternatively open and close the valve assembly 10. Also, inasmuch as the bellows assembly 42 is fixed and sealed in position at the top head 84 thereof with respect to the bonnet 30 and the bore 40 provided therein, the inclusion of the accordion pleats 90 in the intermediate section 88 thereof enables the respective longitudinal extension and contraction of the bellows assembly 42.

It should further be pointed out that some fluid may move past the chamber 24 upwardly into the bore 40 and, accordingly, in contact with the outer surface portions 112 of the accordion pleats 90. However, the actuator rod 78 by reason of its mounting within the bellows assembly 42 is completely shielded thereby from contact with such corrosive fluids which may enter the bore and as they move within the valve chamber 24. In this regard, the boss portion 104 of the nut 102 serves to urge the flange 86 into contact with the ledge 100 as previously indicated such that any fluid that may enter bore 40 is suitably confined therein.

Figure 8:
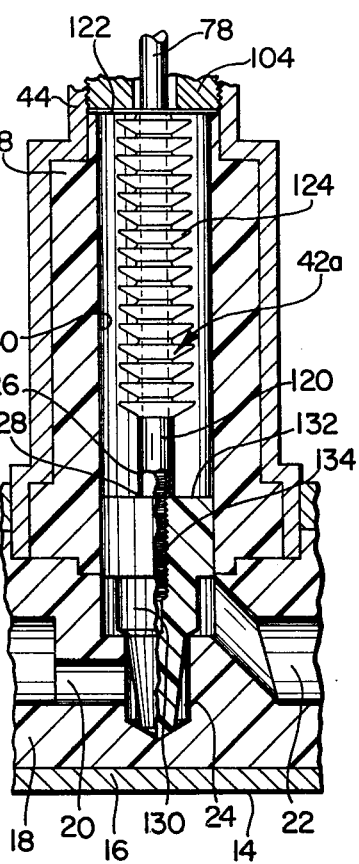
FIG. 8 is an enlarged detailed sectional view of a portion of FIG. 7 showing the modified form of the bellows assembly in closed position.
Figure 7:
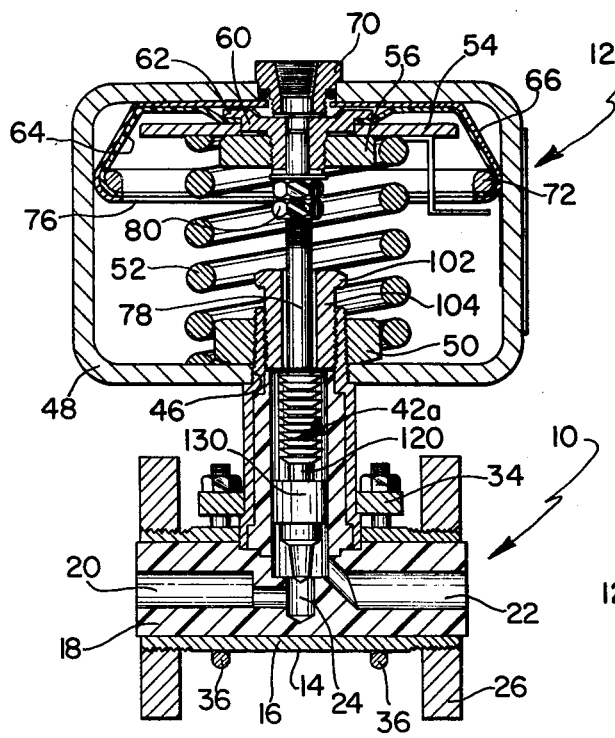
FIG. 7 is a side sectional view similar to FIG. 2 of the drawings but showing an alternate form of bellows assembly.
Figure 9:
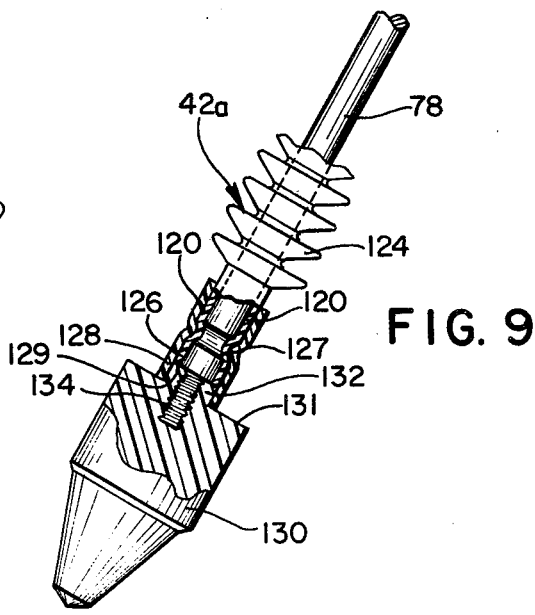
FIG. 9 is an enlarged perspective view of the modified form of the bellows assembly shown in FIGS. 7 and 8.

Turning now to FIGS. 7 through 9 of the drawings, an alternate embodiment of the bellows assembly indicated at 42a is disclosed. In such alternate embodiment, the bellows assembly 42a includes a tube 120 of generally thin-walled construction and terminating at its upper end in an outwardly extending flange 122 having a diameter roughly conforming to that of the outside diameter of the actuator rod 78. The tube 120 includes an intermediate portion including a series of accordion pleats 124 and is fixedly sealed at its other or lower end 126 directly to the underlying portion of the rod 78 as by interconnection with a rod undercut portion 127 by means of the shrinkage of a sleeve 128. The tube terminates in an edge 129 in turn adapted to sealingly abut or otherwise engage surfaces of a separate plug construction 130 having a flat upper surface 131 and including a boss 132 and of a configuration at lower portions thereof similar to plug 92 so as to respectively alternatively open and close the valve assembly 10 within the chamber 24 thereof and to assure a fluid engagement between the terminal edge 129 and the surface 132 of the plug 130. The bottom end of the rod 78 preferably threadably receives an interior plug bore 134 so that the tightening action of the rod with respect to the plug 130 causes the lower edge 129 of the tube 126 to tightly engage the surface 132. In such embodiment, any fluid moving into bore 40 is prevented from reaching the actuator assembly 12 by the coaction of the threaded boss 104 against the outwardly extending tube flange 122. In this alternate form of the invention, it should also be apparent that those portions of the rod 78 which could contact fluid moving within the valve are completely sheathed within the tube 120. The rod is accordingly completely protected by the bellows assembly 42a.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve and valve actuation assembly for controlling the flow of fluids therethrough, said valve assembly comprising a housing including a bonnet and a valve chamber, a longitudinal bore within said bonnet and communicating with said valve chamber, a longitudinally extendable hollow bellows assembly positioned in said bore, means at a first upper end of said bellows for simultaneously positioning the upper end of said bellows in fixed relationship to said bonnet and for sealing said bore, a plug positioned at the opposite end of said bellows and forming an end closure therefor whereby the outer surface of said bellows is substantially fluid impervious, said plug adapted for movement within said chamber between open and closed positions thereof, said actuator assembly including a frame in turn having an actuator rod extending through a fframe opening into the hollow interior of said bellows through an opening positioned above said sealing means in said first end thereof, said rod alternatively extends or contracts said bellows within said bore and moves said plug between said open and closed positions of said valve whereby fluid within said chamber and said bore is prevented from contacting said actuator rod, said bellows assembly comprising a member including a lower plug portion, an intermediate bellows portion having a plurality of accordion pleats and an upper head portion including an outwardly extending sealing and positioning flange, said actuation assembly connected to said bonnet and including actuation drive means including a return motion coil spring housed therein for moving said rod longitudinally with respect to said bore, said bore terminating in an upper inwardly directed seat, an internally threaded bore extension positioned above said seat, said bore extension extending into the interior of said spring and adapted to receive a first threaded nut therein, lower surface portions of said flange adapted to engage said seat and said first nut adapted to engage upper surface portions of said flange whereby said bellows member head is sealingly and fixedly retained within said bore, and said bore extension also having an outer threaded surface portion extending into said actuator assembly frame through said frame opening for receipt of a second nut, said second nut also positioned within the hollow interior of said coil spring and adapted for contact therewith so as to simultaneously position said spring and attach said actuation assembly to said bonnet.

2. The valve construction of claim 1, said bellows assembly being formed of non-corrosive resinous plastic material.

3. The valve assembly of claim 1, wherein said member is of integral construction.

4. The valve assembly of claim 3, said actuator rod connected to an intermediate insert, said insert in turn connected to said plug.

5. The valve assembly of claim 4, said insert having an external diameter essentially equal to the lesser internal diameter of said pleats and extending upwardly from said plug through at least a major portion of said intermediate pleats.

6. The valve assembly of claim 1, said bellows assembly directly connected in sealing relationship to said actuator rod at said lower end thereof.

7. The valve assembly of claim 6, said bellows assembly in the form of a tube of an internal diameter to closely receive said rod, said tube fixedly connected to said rod at a point below said pleated portions thereof whereby said pleats are free to extend and contract according to said rod movements, said tube terminating in a lower edge sealingly engaged to upper surface portions of said plug.

8. The valve assembly of claim 7, said actuator rod extending below said tube lower terminal edge and threadably received in said plug whereby relative rotational movement between said rod and plug causes said tube lower terminal to sealingly engage said plug.

9. The valve assembly of claim 7, said tube being of a generally equal thickness relatively thin-wall construction, and terminating in an upper terminal outwardly extending flange.

* * * * *